UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING A PHENOLIC CONDENSATION PRODUCT.

1,374,526.  Specification of Letters Patent.  Patented Apr. 12, 1921.

No Drawing.  Application filed September 16, 1918. Serial No. 254,370.

*To all whom it may concern:*

Be it known that we, LAWRENCE V. REDMAN, a citizen of Canada, (who has taken out his first papers for citizenship in the United States,) a resident of Evanston, Cook county, Illinois, ARCHIE J. WEITH, and FRANK P. BROCK, citizens of the United States, residing at Chicago, in the county of Cook and State of Illinois, have invented a new and useful Improvement in Processes of Producing a Phenolic Condensation Product, of which the following is a specification.

This invention relates particularly to the production of a phenolic condensation product from a solution of formaldehyde and a phenolic body.

The primary object is to provide a simple process of producing, from formaldehyde and phenol, without the use of a catalyzer, a phenolic condensation product which is free from deleterious substances and which possesses the highest qualities.

The preferred method is as follow:

Boil together substantially equal parts (volume or weight) of a 40 per cent. solution of formaldehyde ($CH_2O$) and phenol ($C_6H_5OH$) until there is obtained as a lower layer a white, creamy, gummy mass and a supernatant aqueous layer, containing approximately 10 per cent. of formaldehyde; discard the aqueous layer, from which any formaldehyde therein may be recovered in any desired manner; introduce into the mass, if necessary, a small additional amount of formaldehyde, say three to five per cent. of the mass, to replace any loss occurring in the boiling operation; pour the mass into molds and subject to heat treatment at a temperature below 100° C. and preferably somewhat above 50° C., until the material becomes sufficiently firm or "set" to enable it to be removed from the molds; and then subject the mass to heat treatment for a prolonged period at a temperature below 100° C. and preferably exceeding 50° C. This may require a period of from one day to several weeks, or until the material becomes sufficiently firm for removal from the molds; and the prolonged heating at moderate temperature may extend over a period of from several weeks to several months in order to produce a hard, resistant and substantially insoluble and anhydrous product.

Where pure phenol, or phenol containing only small proportions of its homologues is employed, a condensation product of yellow or amber color is obtained. This product may however, have a reddish or orange tinge. The product may be improved in color and other qualities by subjecting to it a final heat treatment at a higher temperature, exceeding 100° C. and preferably ranging to about 125° C. or higher. This treatment may be completed within a relatively short period, say a period of several days, and results in eliminating the reddish or orange tinge and giving to the product a clear, light amber or pale lemon color. Also this treatment improves the other qualities, rendering the material capable of being more readily worked, sawed, tooled, sandpapered and buffed. It is probable that some colloidal change takes place in the material during this treatment, which improves the product, giving it a finer color, a better temper and increased tensile strength. If desired, the gummy mass may be concentrated somewhat by a further heating after the aqueous layer has been discarded and before the mass is poured into the molds. Coloring materials may be added or stirred into the mass, as, for instance, auramin, to produce a deep amber color; methyl violet, to produce amethyst; acetyl red, to produce "dregs of wine," etc. Small quantities of these colors, not to exceed ½ of one per cent. of the mass will suffice. Oils and waxes, to produce opaque materials, and ground mica or fish-scales, to produce a shimmering effect, may be employed.

Where phenol is employed, the boiling or condensing operation may require a period of from 60 to 120 hours, depending upon the mass and upon the purity of the phenol, etc. This period may be shortened by closing the still or reflux condenser and allowing the pressure to increase until the temperature is between 100° and 125° C., or higher, preferably about 125° C. In this manner, the time may be reduced so as to enable the operation to be performed in from 12 to 18 hours.

In the case of ordinary commercial cresol, where the boiling operation is at atmospheric pressure, the time required may be from 4 to 12 hours; and in the case of crude cresol, the boiling operation may be completed in about 2 hours.

The concentration may be performed *in vacuo*, if desired; and the hardening operation may be performed at atmospheric pressure, or at higher pressure, or at reduced pressure, or *in vacuo*.

The foregoing detailed description has been given for clearness of understanding only and no unnecessary limitation should be understood therefrom, but the appended claims should be construed as broadly as permissible in view of the prior art.

What we regard as new and desire to secure by Letters Patent is—

1. The process of producing a phenolic condensation product, without the use of a condensing agent, which comprises: boiling together equal parts of a 40 per cent. formaldehyde solution and phenol until there is formed a viscous gummy lower layer and a supernatant aqueous layer containing approximately 10 per cent. of formaldehyde; discarding the aqueous layer; shaping and hardening the mass by subjecting to prolonged heat treatment at a temperature below 100° C. until the mass becomes hard and substantially insoluble and anhydrous throughout; and then subjecting the mass to further heat treatment at a temperature exceeding 100° C. for a relatively short period.

2. The process of producing a phenolic condensation product, which comprises: boiling together substantially equal parts of a 40 per cent. solution of formaldehyde and a phenolic body, without the use of a condensing agent, until there results a thick viscous gummy ungelatinized lower layer or mass and an aqueous upper layer containing approximately 10 per cent. of formaldehyde; discarding the aqueous layer and concentrating the mass; pouring the mass into molds and subjecting to heat treatment at a temperature below 100° C. until the material becomes "set"; then removing the material from the molds and subjecting the same to prolonged heat treatment at a temperature below 100° C. until the mass becomes hard and substantially insoluble and anhydrous throughout; and then subjecting the mass to further heat treatment at a temperature exceeding 100° C. for a relatively short period, for the purpose set forth.

LAWRENCE V. REDMAN.
ARCHIE J. WEITH.
FRANK P. BROCK.